ELECTRICAL WAVE FILTER APPARATUS

Filed March 17, 1955 3 Sheets-Sheet 1

INVENTOR
HEINZ M. SCHLICKE

BY David A. Fox

ATTORNEY

Feb. 28, 1961 H. M. SCHLICKE 2,973,490

ELECTRICAL WAVE FILTER APPARATUS

Filed March 17, 1955 3 Sheets-Sheet 2

INVENTOR
HEINZ M. SCHLICKE

BY David A. Fox

ATTORNEY

INVENTOR
HEINZ M. SCHLICKE

BY David G. Fox

ATTORNEY

United States Patent Office 2,973,490

Patented Feb. 28, 1961

2,973,490

ELECTRICAL WAVE FILTER APPARATUS

Heinz M. Schlicke, Fox Point, Wis., assignor to Allen-Bradley Company, Milwaukee, Wis., a corporation of Wisconsin Filed Mar. 17, 1955, Ser. No. 494,857

11 Claims. (Cl. 333—79)

Figures 1, 2, 3:
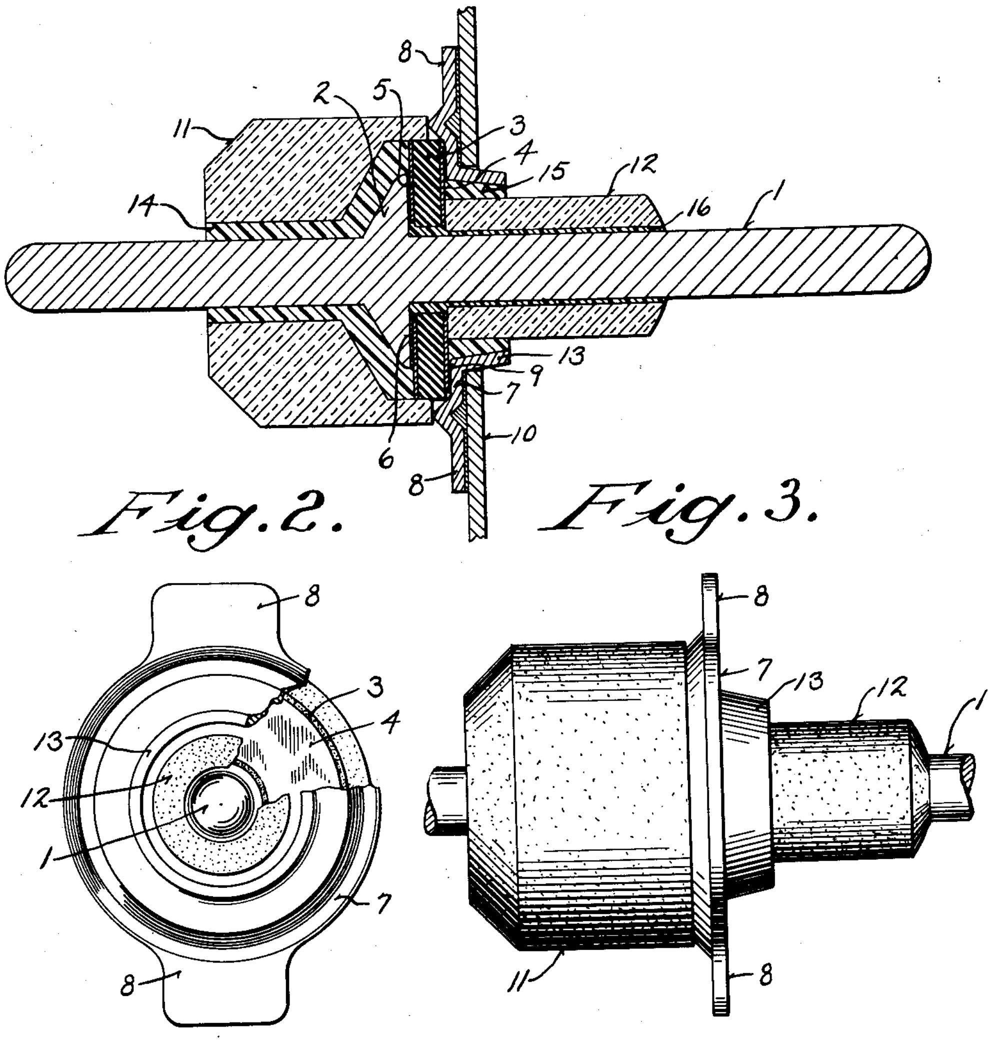

This invention relates to apparatus useful as a broad band filter for high frequency alternating currents or as a circuit network having discriminating or attenuating properties and it resides more particularly in a structure which includes a main conducting channel including one or more elements having the properties of metallic conduction for carrying direct current or alternating current of low frequency, said main channel being disposed adjacent a dielectric body with electrodes forming a capacitor, one or more of the electrodes being connected to one or more of the main conducting elements and another or others being available for connection as a shunt path of comparatively low impedance for high frequency alternating currents, the apparatus including, closely positioned with respect to the dielectric body, a ring member composed of material adapted to respond to such very high frequency magnetic field variations as may be induced by currents flowing in the main conducting channel, said ring being usually located to surround the main conducting channel to provide a closed flux path which will act to increase the equivalent impedance of said main channel conducting elements to alternating currents having a frequency relatively high with reference to the shunt path impedance for currents of such frequency provided by the dielectric body.

The improvement of this invention has special advantages when provided in a form adapted to act as a low pass filter for diverting, from a feed-through conductor, alternating currents of frequencies in the so-called very high and ultra high frequency range, that is to say, several hundred million cycles per second. Presently employed for this purpose are so-called feed-through capacitors. Such feed-through capacitors usually comprise a metallic conducting main central conducting element surrounded by a sleeve of material having a high dielectric coefficient of the outer surface of which carries a metallic coating forming the outer electrode of the capacitor. The outer electrode of the capacitor is, in turn, electrically joined to a flange which may be securely attached electrically and mechanically in an opening in a metallic shielding enclosure. In cases where the attenuation provided by such feed-through capacitors is alone insufficient a series inductive winding or choke, usually located on the interior of the shielding enclosure, is attached directly to the main central conductor. While attenuation is thus much improved, the dimensional spread or physical relationship between the feed-through capacitor and the choke is such that the pick-up of stray high frequency radiation within the shielding enclosure defeats, to a large measure, the theoretical discriminating effect of the network.

A difficult problem has been encountered in attempting to confine radiation resulting from the local oscillators employed in ordinary television receiving circuits. Even though shielding enclosures have been employed, high frequency energy has been carried from such enclosures along the direct current supply conductors which must be provided. Feed-through capacitors with and without inductive windings or chokes, as heretofore known, have been found inadequate to reduce radiation below an objectionable level.

The improvement of this invention provides a broad band low pass filter which, because of its compact form and physical relationship of elements, is self-shielding thus precluding intermediate pick-up of stray radiation. The filter of this invention, therefore, exhibits improved attenuation properties when used where stray radiation is a factor. At the same time, the invention provides an integral unit which may be handled conveniently and installed with a saving in labor and space. The advantages of the apparatus of this invention are such that in the particular case, above described, that is for the confining of radiation from the local oscillator of a television receiving set, adequate shielding is for the first time rendered feasible.

This invention is herein described by reference to the accompanying drawings which form a part hereof and in which there is set forth by way of illustration and not of limitation forms in which the apparatus of this invention may be embodied.

Figure 4:
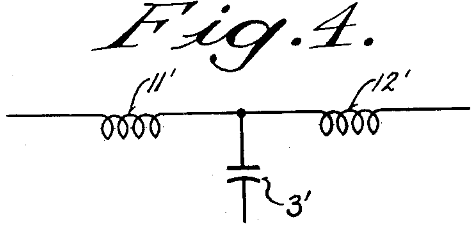
Figures 5, 6, 7, 8:
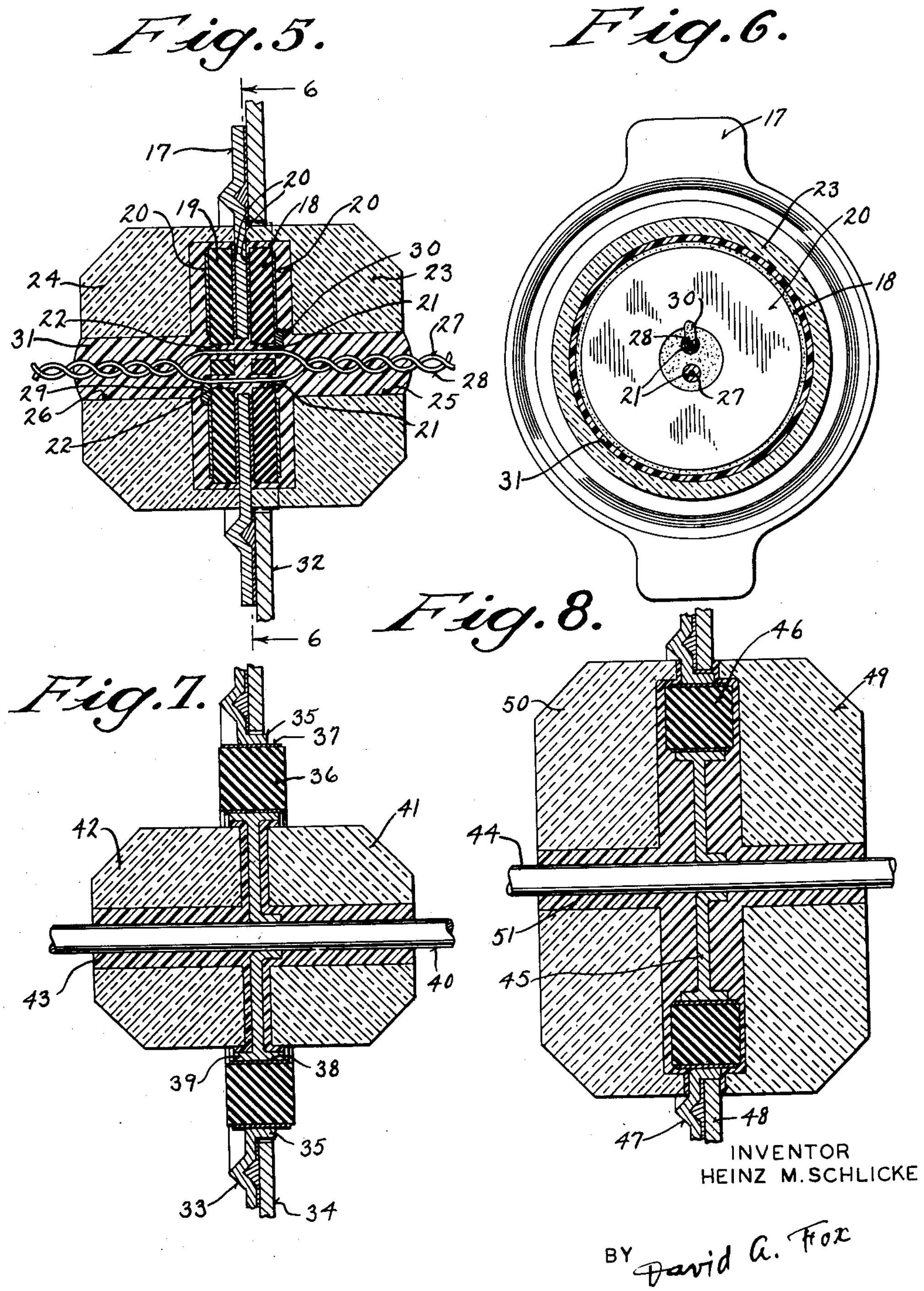
Figure 9:
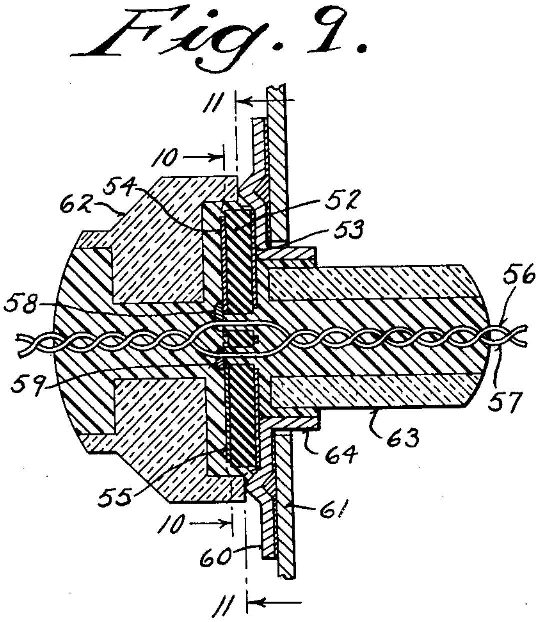
Figure 10:
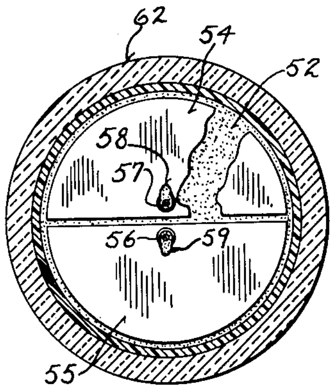
Figure 11:
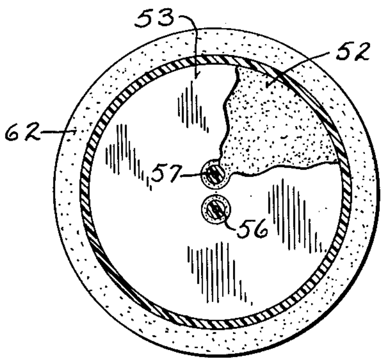
Figure 12:
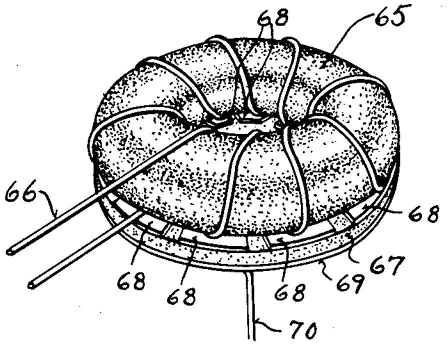

In the drawings:

Fig. 1 is a side view in elevation and in section of one form of the apparatus of this invention, Fig. 2 is an end view in elevation with parts broken away of the apparatus shown in Fig. 1, Fig. 3 is a side view in elevation of the apparatus shown in Fig. 1, Fig. 4 is a diagrammatic showing of the circuit equivalent of the apparatus shown in the previous figures, Fig. 5 is a side view in section of another form of the apparatus of this invention, Fig. 6 is an end view in section of the apparatus shown in Fig. 5 viewed through the plane 6—6, Fig. 7 is a side view in section of another form of the apparatus of this invention, Fig. 8 is a side view in section of still another form of the apparatus of this invention, Fig. 9 is a side view in section of a further form of the apparatus of this invention, Fig. 10 is an end view in section viewed through the plane 10—10 indicated in Fig. 9, Fig. 11 is an end view in section viewed through the plane 11—11 indicated in Fig. 9, and Fig. 12 is a perspective view of another form of the apparatus of this invention.

Referring now, more particularly to Fig. 1 of the drawings, the form of apparatus there shown is provided with a main conducting channel in which there is disposed a metallic conductive element 1 having an integral upset collar 2 approximately midway thereof. The central conducting element 1 is preferably made of copper coated with silver or other substance to minimize the effect of corrosion or to facilitate soldering or both. Closely surrounding the central conducting element 1 is a disc of dielectric substance 3 having a central aperture through the central conductor 1 passes freely without contact. The dielectric body 3 is coated on opposite faces with metallic coatings 4 and 5 closely adherent thereto to provide an effective capacitor.

The capacitor provided by the body 3 and electrodes 4 and 5 preferably includes in the body 3 a substance having a high dielectric constant, say in excess of three hundred and preferably in the neighborhood of one to three or four thousand or higher.

The electrode coating 5 is united with the collar 2, both electrically and mechanically, by means of a fused solder film 6, as shown. The opposite electrode coating 4 of the body 3 is in facing relation with a mounting plate 7 of the configuration shown having mounting ears 8—8. The mounting plate 7 is connected electrically and rigidly united mechanically with the electrode coating 4 of the body 3 by means of a fused solder film 9, as shown.

The mounting plate 7 is intended to be secured in an opening in a metallic shielding enclosure, a portion of which is shown in Figure. 1 in fragmentary form where it is designated by the numeral 10. Attachment to the enclosure 10 may be by soldering or otherwise as desired. While feed-through capacitors have, heretofore, usually been made in elongated, tubular form with an electrode lining the bore and one covering the exterior thereof, I have found that a dielectric body which is shorter than its diameter will perform more satisfactorily. In those cases, however, where an elongated sleeve type capacitor is desired such may be employed in conjunction with this invention.

It is preferred that the dielectric body 3 be formed of a ceramic substance such as the so-called titanates including, but not limited to, the barium titanates, the magnesium titanates and the various mixtures of the same and including the strontianites and zirconates all of which substances are herein sometimes referred to as "titanates." These compositions exhibit the large dielectric constants heretofore mentioned and are well-known and, therefore, are not herein described in detail. Other dielectric substances may be employed as well.

Adjacent the dielectric body 3 and partly surrounding the same is a ring of material 11 having the configuration shown and composed of a substance providing a flux path responsive at higher frequencies. In similar fashion, a ring or sleeve of like material 12 is so disposed as to surround the main conducting element 1 immediately adjacent the dielectric body 3 within the short, sleeve-like boss 13 of the mounting plate 7. The substance of which the bodies 11 and 12 may be composed is, preferably, a composition of the type designated ferrite. The ferrites are sintered metallic oxides or mixtures of the same having the mechanical properties of ceramic materials with relatively high electrical resistivity but having the low reluctance characteristic of ferromagnetic substances while admitting high frequency flux variations because of low eddy current losses. In lower frequency ranges, powdered iron aggregates may have properties suitable for the formation of the bodies 11 and 12. In the upper frequency ranges, however, substances of the ferrite type will usually be found essential or at least more advantageous.

The circular bodies 11 and 12 surrounding the main central conductor 1 provide a flux path for the magnetic field surrounding the conductor and, consequently, when the frequencies are high give rise to substantial impedance in the conductor 1 in the vicinity of the bodies 11 and 12. Since these bodies are immediately adjacent the dielectric body 3, or surround or partially surround the same, there is substantially no exposed interval or window in the main conductor 1 which is exposed to pick-up of stray radiation. The attenuation factor for high frequency, therefore, is maintained at a higher level.

In assembling apparatus, such as appears in Figs. 1, 2 and 3, in order to render the same less susceptible to deterioration under atmospheric conditions, it is desirable that the various voids between parts be closed and sealed with a suitable sealing compound or wax such as is indicated at 14 to the left of the dielectric body 3 and at 15 and 16 at the right of the dielectric body 3.

Electrically, as indicated in the diagrammatic showing in Fig. 4, the correlation between the magnetic bodies 11 and 12 and the central conductor 1 is such as to provide two impedances indicated at 11′ and 12′ in Fig. 4. The function of the dielectric body 3 in the same diagram, is indicated by the capacitor 3′. There is thus produced the well-known configuration of a T filter. Other filter networks may be easily elaborated by correlation of the magnetic bodies employed with the capacitor element or elements in accordance with known network arrangements. In any arrangement constructed in accordance with this invention, an electrically non-conductive body providing a flux path is placed in close proximity to or surrounding a dielectric body having electrodes joined in capacitive relationship. In this way the low impedance of the capacitive element to high frequency currents is placed in juxtaposition physically with the high impedance of the inductive reactance produced by the magnetic body surrounding the conductor, thus minimizing pick-up of stray radiation.

The bodies 11 and 12, as noted above, are preferably formed of a magnetic substance of the general class known as ferrite. Such substances are known and have been described by others. For most commercial purposes the ferrites consist of artificially prepared minerals exhibiting the spinel structure and consist of solid solutions of metallic oxides with the general formula $MFe_2O_4$ where M represents a bivalent metal. The bivalent metal, for most purposes, will include iron, nickel, zinc, copper, magnesium and manganese. In addition it is possible to incorporate other monovalent or polyvalent metal oxides in the structure. For example, lithium and aluminum oxides may be incorporated in varying amount.

All of the ferrites are high in specific resistivity as is characteristic of the oxides. Because of their extreme hardness and brittleness ferrite bodies are formed and shaped by methods closely resembling ceramic processing.

On account of the high specific resistivity of the ferrites, formation of eddy currents is strongly inhibited and the skin effect present at higher frequencies with metallic magnetic bodies is not a factor of consequence. In the case of the ferrites and all other known magnetic substances as the frequency of the impressed magnetizing force increases, residual losses and hysteresis losses increase independently of the skin effect with a drop in effective or measurable permeability. Above about 100 to 200 megacycles, effective permeability falls below a usable fraction of the direct current permeability for all known magnetic substances. At the same time the losses, indicated above, markedly increase but this increase in losses may be put to useful purpose. The frequency at which the Q drops below 5 is called the critical frequency and this may be as low as 3 or 4 megacycles in the case of some ferrites.

It is the discovery of this invention, that the ferrites, as a class, while employed in the physical relationship herein described, possess a useful property not heretofore availed of, at frequencies far above the so-called critical frequency, that is to say up to and even beyond 1000 megacycles. This useful property, in effect, imposes impedance in the main central conductor 1 to passage of the high frequency current by means other than inductive reactance. Whether such be impedance in the usual sense in which this term is employed, or whether absorption and dissipation of energy is operative to produce the result desired may not be fully answered by explanation presently available. The theory, however, is well accepted, that the increase in losses within the ferrite with increasing frequency and the drop in permeability at and near critical frequency is related to certain properties of resonance in the fine structure of the material. These considerations have led investigators, dealing with ferrites, away from attempts to employ them to useful effect where frequencies have approached and certainly where they have exceeded the so-called critical value.

Nothwithstanding, the losses occurring above critical frequencies in ferrites are losses which are, in a sense, magnetically induced and depend upon the provision of a flux path wherein flux density will exceed that in air. The filters of this invention produce an attenuation markedly superior to that obtainable by a dielectric sleeve alone or in conjunction with an air core choke in the frequency ranges commonly employed in television receiver circuits.

This result is obtainable effectively for practical applications through use of the structure of this invention in which a dielectric body with electrodes forming a capacitor is placed in close dimensional relationship with a conductor surrounded by magnetic body formed of a substance having high specific resistivity.

Appearing in Figs. 5 and 6 is a form of the apparatus of this invention better suited to the handling of feed-through currents of substantial value. In this case the apparatus is provided with a mounting plate 17 having a central aperture which is surrounded on its opposite sides by capacitor members comprising discs 18 and 19 composed of a ceramic substance having a high dielectric coefficient. The discs 18 and 19 bear electrode coatings 20 on opposite sides formed of suitable metal tightly adhering thereto. The coatings 20 are open at their centers and adjacent the mounting plate 17 are secured thereto both electrically and mechanically by a solder film, not shown, in a well-known manner. The ceramic discs 18 and 19 are each provided with a pair of perforations 21—21 and 22—22 in alignment with one another.

Surrounding and enclosing the capacitor discs 18 and 19 are magnetically responsive bodies 23 and 24 provided with main central conducting channels 25 and 26 respectively. The bodies 23 and 24 may be composed of ferrite or other suitable material as described above. Extending through the main conducting channels 25 and 26 are metallic conductors 27 and 28 bearing an insulating coating, not shown, twisted with one another as appears. Conductor 27 passes through the lower perforations 21 and 22 in the capacitor discs 18 and 19 and is connected electrically by a solder bead 29 to the outer electrode coating 20 adhering to ceramic disc 19. Conductor 27 is similarly connected by a solder bead 30 to the outer electrode coating 20 adhering to the ceramic disc 18 and then passes toward the left through the upper perforations 20 and 21.

The voids in the main conductor channels 25 and 26, in the perforations 21 and 22 and in the spaces adjacent the ceramic discs 18 and 19, are preferably filled with a suitable wax-like sealing substance 31.

With the arrangement above described both leads of a low frequency or direct current circuit entering and leaving the shielded enclosure such as is indicated at 32 are preferably caused to be carried upon the conductors 27 and 28 so as to produce, due to the opposite direction of flow of current, an off-set condition so far as the magnetic fields resulting therefrom are concerned. In this way little or no flux is induced in the bodies 23 and 24 by the direct current or low frequency loads carried by the conductors 27 and 28 and the bodies 23 and 24, consequently, remain free of any substantial pre-saturation effect which would otherwise impair their ability to perform the absorbing or suppressing function intended.

In the form of the apparatus shown in Figs. 5 and 6, the bodies 23 and 24 are closely adjacent the capacitors and, in fact, surround the same, furnishing a substantially complete shield closely restricting the stray radiation which may otherwise have access to the conductors 27 and 28 at and near the junction of the same with the capacitors.

In certain instances it is advantageous to employ a capacitor having coaxial electrodes and there is set forth in Fig. 7 a form of the apparatus of this invention employing a capacitor of this nature. In this form, a mounting plate 33 is arranged for attachment in an aperture in a shielding enclosure 34 as shown. The mounting plate 33 is formed with a central opening defined by a laterally turned flange 35 which provides a seat receiving a capacitor comprising an annular body 36, composed of a ceramic substance having a high dielectric coefficient. The outer periphery of the ceramic body 36 is provided with a tightly adhering metallic coating 37 acting as an electrode which is connected electrically and united mechanically with the flange 35 of the mounting plate 33 by a solder film not shown. The internal wall of the body 37 is provided with a tightly adhering metallic coating 38 which, is in turn, joined electrically and mechanically with a peripherally flanged central mounting disc 39 by a solder film not shown.

The central disc 39 receives in a flanged central opening therein a central feed-through conductor 40. Disposed on opposite sides of the disc 39, surrounding the conductor 40, are bodies 41 and 42 of ferrite or other magnetically responsive material as herein described.

The voids between the conductor 40 and the bodies 41 and 42 and between these bodies and the disc 39 are preferably filled with a wax-like sealing substance 43.

In instances where a construction such as appears in Fig. 7 does not afford adequate shielding of the junction between the feed-through conduictor and the capacitor, a construction, such as is illustrated in Fig. 8, may be employed. The apparatus here appearing is similar to that shown in Fig. 7 in that the feed-through conductor 44 is held within and electrically connected to a central disc 45 which is joined, in turn, with the internal electrode of a peripheral capacitor 46. The latter is connected to and held within an opening in a mounting plate 47 which may be attached, as shown, in an opening in a shielding enclosure 48.

The feed-through conductor 44 is surrounded by bodies 49 and 50 composed of ferrite or other magnetically responsive material as described. In this instance, however, the bodies 49 and 50 not only extend radially beyond the outer periphery of the capacitor 46 but also turn axially toward one another to enclose a part of the outer periphery of the capacitor 46, thus affording more complete shielding of the junction between the conductor 44 and the capacitor 46. Here again the voids are preferably filled by a sealing compound 51.

In instances where an exceptionally compact construction is desired and one is sought in which presaturation due to the effect of the feed-through current is avoided, the apparatus of this invention may be embodied in the form appearing in Fig. 9. In this instance, a single ceramic body 52 is arranged to form the basis for two separate capacitors by providing a continuous electrode coating 53 on the right hand side of the body and by providing two semi-circular and distinct electrode coatings 54 and 55 on the left hand side thereof. The coating 53 and the ceramic body 52 are preforated near the center, as shown more clearly in Figs. 9 and 11, to pass without electrical contact, the feed-through conductors 56 and 57 which are twisted upon one another as shown. The conductors 56 and 57 carry an insulating coating, not shown, which is removed where the same emerge at the left hand side of the ceramic body 52. At this point solder beads 58 and 59 join the conductors 57 and 56, respectively, to the electrode coatings 54 and 55.

The electrode coating 53 on the ceramic body 52 is tightly joined electrically and mechanically by a solder film, not shown, to a mounting plate 60. The plate 60 may, in turn, be secured in an opening in a shielding enclosure 61.

The leads 56 and 57 are surrounded at their left hand ends by a body of magnetically responsive material 62 mounted, as shown, to enclose the capacitors formed of the ceramic body 52. At their opposite ends the conductors 56 and 57 are surrounded by a sleeve of magnetically responsive material 63 inserted, as shown, within flange 64 formed as a part of mounting plate 60. The bodies 62 and 63 are formed of materials such as are described above, preferably ferrites but any other magnetically responsive material, having the properties indicated, will serve equally as well.

In certain cases, for example, where lower frequencies may be involved, the apparatus of this invention may be, at times, advantageously constructed in the form appearing in Fig. 12. In this form, a ring of magnetically responsive material 65 is wound in toroidal configuration as shown with a winding 66. The wound body 65 is superposed upon a ceramic disc 67 formed of a substance having a high dielectric coefficient as, for example, a titanate.

The disc 67 is provided with a plurality of tightly adhering sector shaped metallic coatings one for each turn of the winding 66. Fused solder between the facing parts of the turns of winding 66 and the coating sectors 68 serves to mechanically unite the apparatus as a unit and to provide individual electrical contacts between respective turns and electrodes.

It is explained that the sectors 68 are physically and electrically separated from one another as appears. The lower face of the disc 67 is provided with a tightly adhering metallic coating 69 forming a common electrode which is provided with a connection lead 70.

The winding 66 is thus provided with distributed branch capacity in a compact and simple form with electrical advantages. Because of the close physical proximity between the turns of winding 66 and the associated individual capacitors, the properties of the filter unit, appearing in Fig. 12, are improved.

In instances where radiation in substantial quantity is to be absorbed or diverted the apparatus of this invention is, at times, effective to a degree sufficient to result in undesirable temperature rises unless suitable provision for removal of heat is made. The solid contact provided by sealing compounds introduced into the voids as described is helpful for this purpose since the shielding enclosure to which the unit is secured can often be depended upon to extract heat at a fairly rapid rate. At times, also, the central conductor may contribute significantly to the necessary removal of heat. In some instances, adequate provision for energy absorption and dissipation can be made by simply increasing dimensions. In other cases increased convection areas of the unit may be provided by well-known means such as the formation of ribs or fins in the exposed parts.

In cases where desired, units, such as appear in Figs. 7 and 8, may be constructed with corrugation circumferentially of the capacitor rim not only to increase heat dissipation but to provide increased electrode area.

I claim:

1. In a broad-band low-pass filter for diverting alternating electric currents of higher frequency while furnishing an electric path of low impedance to lower frequency currents including direct currents, the combination of means comprising electrically conductive material for attaching the filter to an electrically conductive shielding enclosure adjacent an aperture in the latter; a feed-through conductor adapted to extend through such aperture and having metallic conductive properties providing a relatively low impedance path for lower frequency alternating current; a capacitor having an axial opening through which said conductor passes and comprising a dielectric body having electrodes on opposed faces thereof and in capacitive relation thereto, at least one of said electrodes being electrically connected to said feed-through conductor intermediate the ends thereof, and one other of said electrodes being provided with a connection to said attaching means for carrying diverted higher frequency currents; and a magnetically responsive member closely adjacent said capacitor comprising a closed ring of a ferrite substance having high specific electrical resistivity and substantial permeability, said ring being disposed to surround a portion of said feed-through conductor which is adjacent said aperture in the shielding enclosure when the filter is attached to the latter, said ferrite ring and said mounting means co-operating to provide a substantially windowless shield for the aforesaid portion of the conductor.

2. A broad-band filter in accordance with claim 1 wherein the dielectric body comprises a substance selected from the group consisting of titanates, zirconates and strontianites having a dielectric constant in excess of 300.

3. A filter in accordance with claim 1 wherein the dielectric body is disc shaped with a central opening through which the feed-through conductor extends and the capacitor electrodes are in engagement with the opposite faces of the dielectric disc.

4. A filter in accordance with claim 3 wherein the means for attaching the filter to a shielding enclosure comprises a mounting plate secured mechanically and electrically to one of the capacitor electrodes and the other electrode is secured mechanically and electrically to the feed-through conductor to provide mechanical support for the filter.

5. A filter in accordance with claim 1 wherein the magnetically responsive member comprises a cap surrounding one end surface and a portion of the outer periphery of the capacitor to form an electrical shield for the capacitor.

6. In a broad-band, low-pass, feed-through filter for diverting alternating electric currents of higher frequency while furnishing an electric path of low impedance to lower frequency currents including direct currents, the combination of means comprising electrically conductive material for attaching the filter to an electrically conductive shielding enclosure adjacent an aperture therein; a pair of side by side feed-through conductors adapted to extend through such aperture, said conductors having metallic conductive properties providing entering and exit relatively low impedance paths for oppositely flowing substantially equal lower frequency alternating currents; a pair of capacitors, one of which is located close to each of said feed-through conductors along side the same, each capacitor comprising a dielectric body and electrodes in capacitive relation thereto, at least one of the electrodes of each capacitor being electrically connected to its respective feed-through conductor intermediate the ends thereof, and the other electrode of each capacitor being provided with a connection to said attaching means for carrying diverted higher frequency currents; and a magnetically responsive member comprising a closed ring of a ferrite substance having high specific electrical resistivity and substantial permeability, said ring being disposed to surround portions of said feed-through conductors which are adjacent said aperture in the shielding enclosure when the filter is attached to the latter, said ferrite ring and said mounting means co-operating to provide a substantially windowless shield for the aforesaid portions of the conductors.

7. A broad-band filter in accordance with claim 6 wherein the dielectric bodies of the capacitors comprise a high coefficient dielectric substance selected from the group consisting of titanates, zirconates and strontianites having a dielectric constant in excess of 300.

8. A filter in accordance with claim 6 wherein the capacitors include dielectric bodies which surround the feed-through conductors.

9. A filter in accordance with claim 6 wherein the capacitors are disc shaped with central openings through which the feed-through conductors extend and at least one of the capacitor electrodes surrounds the feed-through conductors.

10. A filter in accordance with claim 9 wherein the means for attaching the filter to a shielding enclosure comprises a mounting plate secured mechanically and electrically to at least one of the capacitor electrodes which surrounds the feed-through conductors, and other electrodes are secured mechanically and electrically to the feed-through conductors to provide mechanical support for the filter.

11. In a feed-through filter the combination of means comprising electrically conductive material for attaching the filter to an electrically conductive shielding enclosure adjacent an aperture therein, a central feed-through conductor adapted to extend through said aperture, a pair of unitary spaced magnetic ring members each being disposed to surround a portion of said feed-through conductor adjacent the enclosure aperture when the filter is attached to the enclosure, and to co-operate with said attaching means to provide a substantially windowless shield for the aforesaid portion of the conductor, and a capacitor comprising a dielectric body adjacent said feed-through conductor disposed between and closely adjacent to said magnetic ring members and occupying a major part of the space therebetween said dielectric body having spaced electrodes engaging the surfaces thereof, one of said electrodes being electrically connected to said feed-through conductor and the other electrode being electrically connected to the attaching means.

References Cited in the file of this patent

UNITED STATES PATENTS

| | | |
|---|---|---|
| 1,790,234 | Gymnaitis | Jan. 27, 1931 |
| 2,221,105 | Otto | Nov. 12, 1940 |
| 2,258,261 | Roosenstein | Oct. 7, 1941 |
| 2,283,924 | Harvey | May 26, 1942 |
| 2,407,916 | Berg | Sept. 17, 1946 |
| 2,549,424 | Carlson et al. | Apr. 17, 1951 |
| 2,565,231 | Hepp | Aug. 21, 1951 |
| 2,594,890 | Ellwood | Apr. 29, 1952 |
| 2,668,946 | Bennett | Feb. 9, 1954 |
| 2,756,375 | Peck | July 24, 1956 |
| 2,759,155 | Hackenberg | Aug 14, 1956 |
| 2,776,411 | Anderson | Jan. 1, 1957 |
| 2,798,207 | Reggia | July 2, 1957 |

FOREIGN PATENTS

| | | |
|---|---|---|
| 227,714 | Switzerland | Sept. 16, 1943 |
| 607,394 | Great Britain | Aug. 30, 1948 |

OTHER REFERENCES

Reggia: "U.H.F. Magnetic Attenuator," Radio-Electronic Engineering, vol. 20, No. 4, April 1953, pages 12–14 and 24.